(12) United States Patent
Cage

(10) Patent No.: US 6,913,275 B2
(45) Date of Patent: Jul. 5, 2005

(54) PROCESS OF ALTERING BICYCLE FRAME HEAD TUBE ANGLE BY CUTTING A SLOT IN BOTTOM BRACKET AND BENDING FRAME HERE

(75) Inventor: John Cage, 1101 N. Livingtson St., Bloomington, IL (US) 61701

(73) Assignee: John Cage, Bloomington, IL (US)

( * ) Notice: Subject to any disclaimer, the term of this patent is extended or adjusted under 35 U.S.C. 154(b) by 0 days.

(21) Appl. No.: 10/307,591

(22) Filed: Mar. 12, 2003

(65) Prior Publication Data

US 2003/0160422 A1 Aug. 28, 2003

Related U.S. Application Data

(60) Provisional application No. 60/358,954, filed on Feb. 25, 2002.

(51) Int. Cl.$^7$ .................................................. B62K 1/00
(52) U.S. Cl. .................................................. 280/281.1
(58) Field of Search .............................. 280/281.1, 287, 280/7.1, 7.11

(56) References Cited

U.S. PATENT DOCUMENTS

| | | | | | |
|---|---|---|---|---|---|
| 4,015,854 | A | * | 4/1977 | Ramond | 280/281.1 |
| 4,621,827 | A | * | 11/1986 | Klein | 280/288.3 |
| 4,923,203 | A | * | 5/1990 | Trimble et al. | 280/288.3 |
| 5,249,818 | A | * | 10/1993 | Patterson | 280/281.1 |
| 5,290,054 | A | * | 3/1994 | Po | 280/288.1 |
| 5,476,278 | A | * | 12/1995 | Levin et al. | 280/288 |
| 5,478,100 | A | * | 12/1995 | McDermitt et al. | 280/281.1 |
| 5,851,034 | A | * | 12/1998 | Shah | 285/16 |
| 6,497,426 | B2 | * | 12/2002 | VanPelt | 280/287 |

* cited by examiner

Primary Examiner—Lesley D. Morris
Assistant Examiner—L. Lum

(57) ABSTRACT

This process is for adjusting the head tube angle on a bicycle frame without removing the head tube from the frame.

1 Claim, 3 Drawing Sheets

PROCESS OF ALTERING BICYCLE FRAME HEAD TUBE ANGLE BY CUTTING A SLOT IN BOTTOM BRACKET AND BENDING FRAME HERE

Cross—reference to related applications. This application has priority to provisional application 60/358,954 filed Feb. 25, 2002.

BACKGROUND-FIELD OF INVENTION

This process allows for the adjustment of the head tube angle without removing the head tube from the bicycle frame.

BACKGROUND-DESCRIPTION OF PRIOR ART

Recumbent bicycles have rapidly been gaining popularity and are currently expensive. An inexpensive method of producing a recumbent bicycle is to weld a boom tube onto the front of a juvenile, or BMX bicycle. A "boom tube" is a large tube (approx. 2" diameter), which extends forward from the bike's head tube, above and beyond the front wheel, and has the crankset and pedals mounted at it's front end.

The advantages here are that the bicycle has a low height for easy step-over, and a low seat height. Also, the small wheels (particularly the front wheel) allow for ample clearance between the rider's feet/pedals, and the wheel. This is important to prevent foot/wheel interference while pedaling the bike through turns.

The disadvantage of using the BMX or juvenile type bicycle is that it has a short wheelbase, and produces a rough or choppy riding recumbent bicycle.

Another method of producing a recumbent bicycle would be to take a larger bicycle with a longer wheelbase, and convert this type of bicycle for use as a recumbent, by installing a boom tube and smaller diameter front wheel, or a set of smaller wheels.

Using either a smaller diameter front wheel, or set of smaller diameter wheels will usually result in a bicycle which does not steer properly. To improve steering, one must alter the head tube angle of the frame with respect to the ground.

DETAILED DESCRIPTION

The following operations describe a process by which a standard diamond shaped bicycle frame is altered for use a recumbent, by altering the head tube angle.

Figure 1:
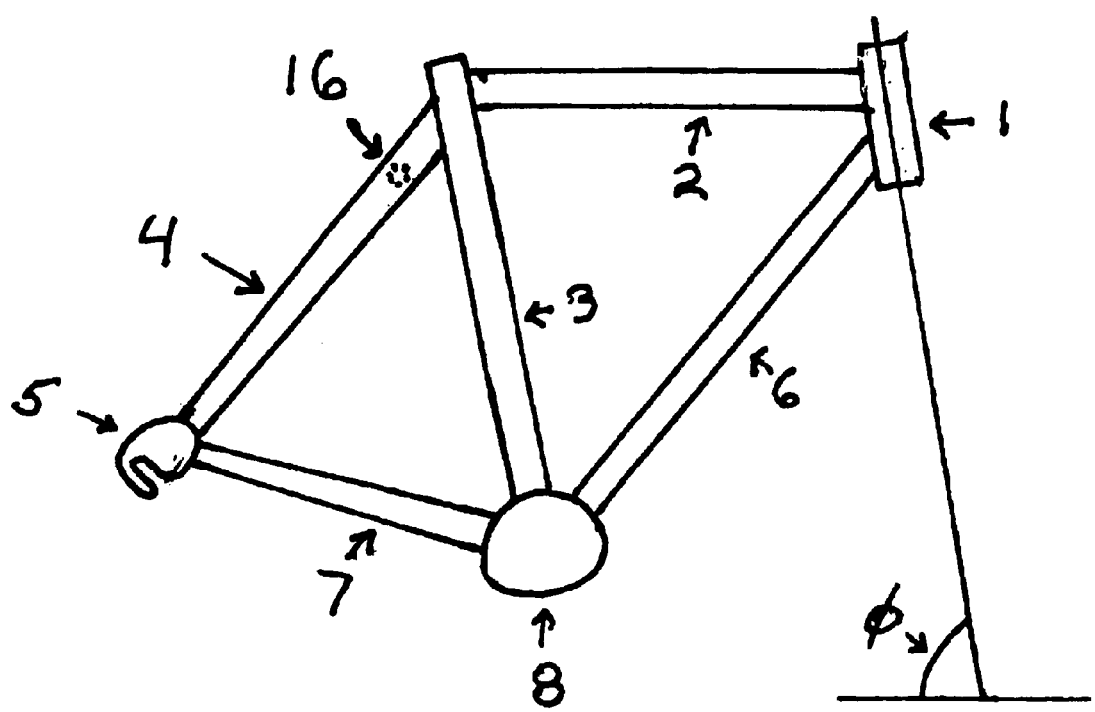
FIG. 1 shows a standard bicycle frame with indicators for areas for alteration.

Operation—FIG. 1

FIG. 1 illustrates a standard bicycle frame with the components numbered. The rear brake bridge is hidden in this view, but it is a small tube connected to both seat stays, and is located approximately 2 to 4 inches from the top of the seat stays. It has a hole at it's center, for attaching the rear brake mechanism. Also note the angle labeled, which is the angle of the head tube with respect to the ground.

Figure 2:
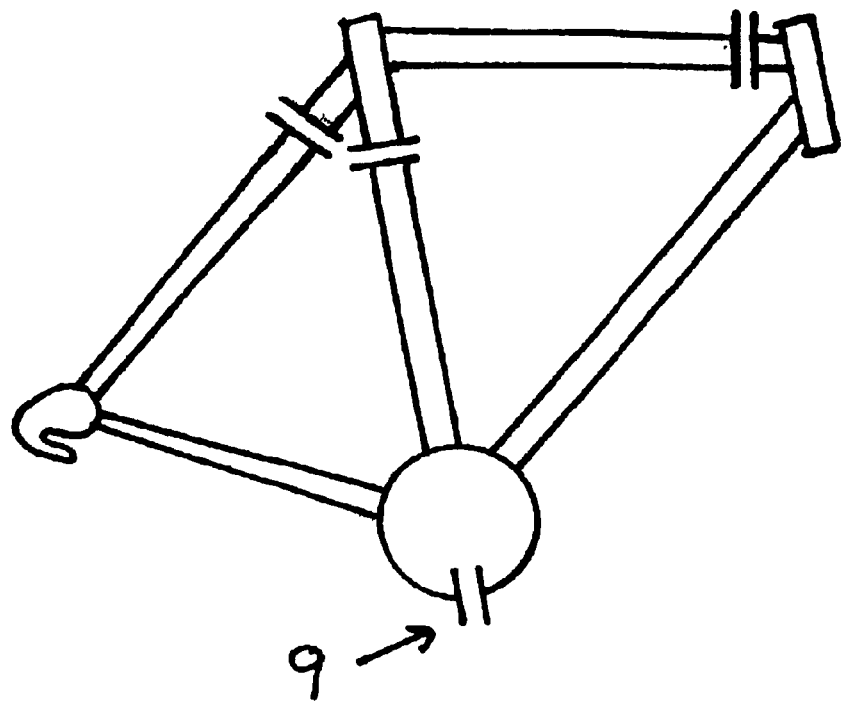
FIGS. 2–4 show successive stages of alteration.
Figure 3:
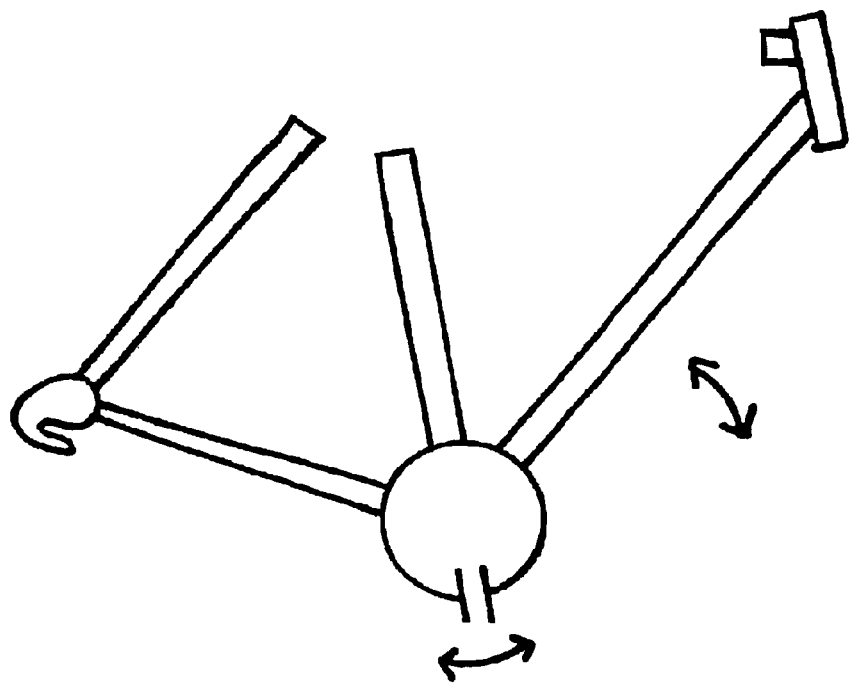
Figure 4:
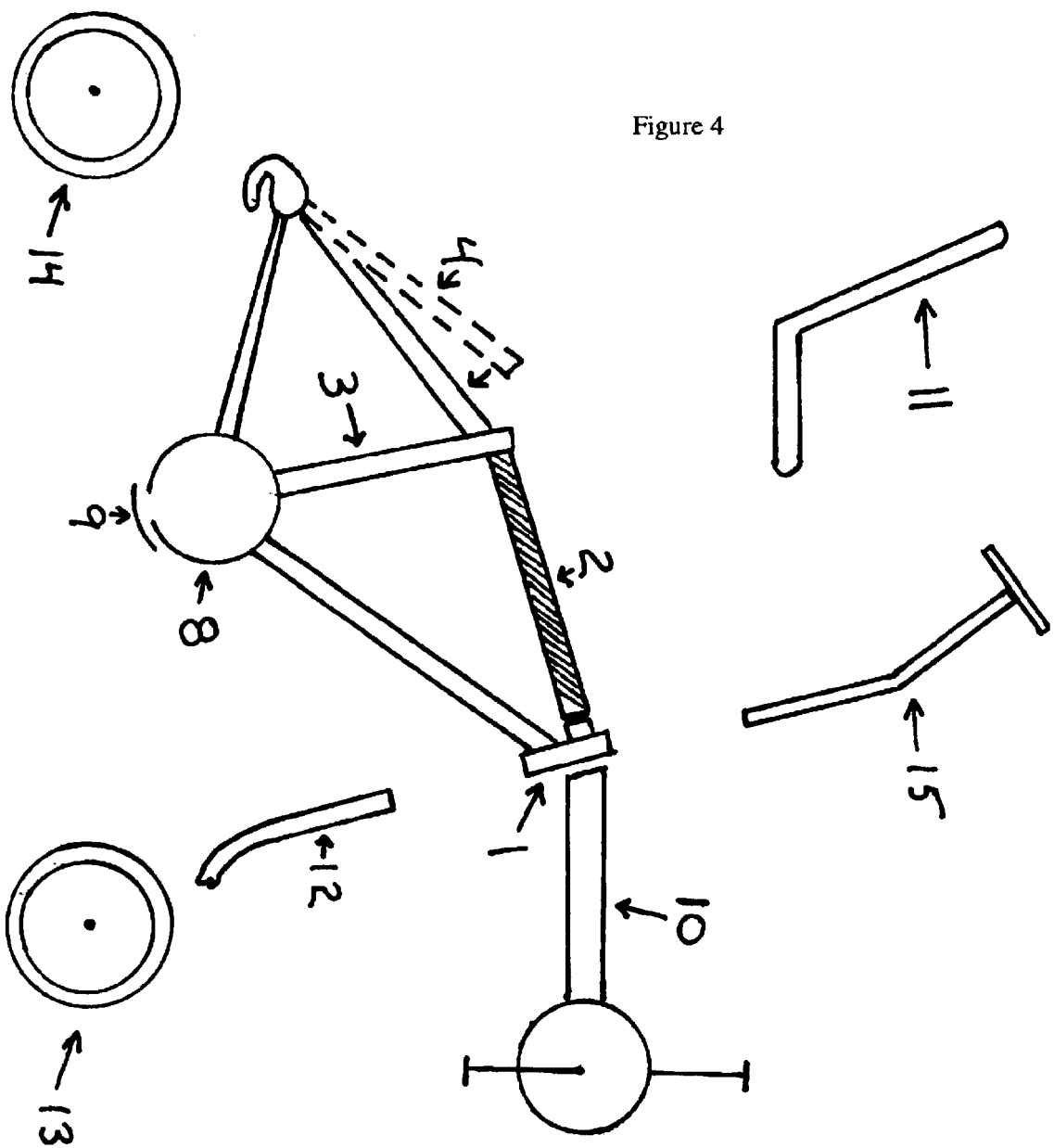

Following the steps outlined in Operations—FIG. 2 through FIG. 4 describe removing the top tube from the frame and reducing the length of the seat tube, and seat stays. This will result in a recumbent bicycle with a low step-over height.

NOTE: For a tall rider, or a rider wanting a high riding position, one may use a frame with long chain stays (approx. 17.5 or more), and DO NOT CUT THE TOP TUBE OR SEAT TUBE. Instead, simply disconnect the seat stays (4), from the seat tube (3), cut across the brake bridge (16), and spread the seat stays apart slightly. Next, cut across the bottom bracket shell (8), as described in Operation—FIG. 2, and proceed to the next operation.

Operation—FIG. 2

The first step is to make a cut in the frame at top tube (2), cut through the seat stays (4), at a point below the brake bridge (16). Next cut across the seat tube (3), then cut a slot across the bottom bracket shell (8) between the down tube (6), and chain stays (7).

Operation—FIG. 3

Bend the frame to change the width of the slot (9), to achieve the desired head tube angle required for proper steering geometry.

NOTE: The following steps occur after the claimed process has been deployed, and are listed in order to finish building a rideable recumbent bicycle.

Operation—FIG. 4.

The top tube (2) is welded to both the seat tube (3) and the head tube (1).

The seat stays (4) are bent forward and welded either to the top tube (2), Or the seat tube (3).

The slot (9) in the bottom bracket shell (8) is welded, or bridged and welded

The boom assembly (10) is welded to the head tube (1).

The seat (11), fork (12), front wheel (13), rear wheel (14), and handlebar Assembly (15) are installed.

By using this method, one may quickly produce a rideable recumbent bicycle cheaply.

NOTE: It is strongly suggested that one uses either a heavy electroforged 10 speeed type frame, or a tig welded mountain bike frame. Do not use a light weight lugged frame of the type used in racing or road bicycles. Also do not use aluminum frames, or the inexpensive department store bike frames.

SUMMARY

By using the method outlined above, one:

a) does not need to disconnect the head tube from the frame;

b) eliminates time consuming process of reattaching the head tube;

c) eliminates time consuming process of aligning head tube;

d) produces a rideable bicycle quickly and with less expense than building one from scratch.

I claim:

1. A process for altering a head tube angle of a diamond shaped bicycle frame having a top tube, a head tube at an angle with respect to the ground, a seat tube, a rear brake bridge connecting a seat stays, two dropouts, a downtube, two chainstays and a bottom bracket shell, the process comprising:

a) disconnecting the seat stays from the seat tube;

b) cutting through the rear brake bridge;

c) spreading the seat stays apart;

d) cutting a slot across a underside of the bottom bracket shell, between the down tube and chainstays;

e) bending the frame to increase a width of the slot, which raises the position of the dropouts, and tips the frame backward. This results in a change in the head tube angle of the frame relative to the ground.

* * * * *